UNITED STATES PATENT OFFICE.

J. J. MAPES, OF NEWARK, NEW JERSEY.

IMPROVEMENT IN FERTILIZERS.

Specification forming part of Letters Patent No. 26,507, dated December 20, 1859.

*To all whom it may concern:*

Be it known that I, J. J. MAPES, of Newark, New Jersey, have invented an Improved Fertilizer of Soils, called the "Nitrogenized Superphosphate of Lime," of which the following is a full, clear, and exact description.

By the analysis of soils and plants it is well known what are their constituents, and it is also well known that the continued cropping of soils with less amounts of amendments than those removed as constituents of the crops must gradually impoverish the soil, and in consequence we find the uneven or unequal removal of these constituents to render the soil unfit for the raising of wheat and other crops requiring the presence of phosphoric acid, lime, potash, &c., they being among the first of the natural constituents of the soil parted with; and hence the continued reduction of the wheat and other crops per acre in the older States, to which may be added many plants of a succulent character and quick growth, requiring larger amounts of animal matter than plants of other constituencies, such as wheat. Many soils are deficient of organic matter of animal origin, and require such amendments before the constituents of the soil can be rendered available for the use of plants, for the purpose of restoring or supplying to soils the constituents required for the favorable production of plants of a succulent character and rapid growth, &c.

The nature of my invention consists in combining equal, or nearly, quantities, by weight, of dried blood with what I call my "improved superphosphate of lime," which is prepared by saturating calcined bones or other phosphate of lime with sulphuric acid, and then adding to the product guano and sulphate of ammonia.

The mode of procedure which I have tried with success is to take one hundred parts, by weight, of apatite or calcined bones, or other phosphate of lime, and saturating it in a suitable vessel with fifty-six parts of sulphuric acid of commerce, and after part of the lime has combined with the sulphuric acid, forming sulphate of lime, and the phosphoric acid has combined with the remaining portion of lime, forming superphosphate of lime, I then add and thoroughly mix therewith thirty-six parts of Peruvian guano, and twenty parts of sulphate of ammonia, or an equivalent addition of the ammoniacal liquor of gas-works, or other ammoniacal waste. The composition thus produced I then mix and grind together with equal quantities, by weight, of dried blood.

I do not claim the use of either of the constituents herein specified separately as fertilizers, as they have heretofore been used; nor do I claim what I call my "improved superphosphate of lime," as I have made this the subject of a separate application for Letters Patent.

I do not claim the mixture of earthy phosphates or of superphosphates in general with dried blood in their various proportions, as such mixtures are already well known, and therefore not patentable; and I wish it to be understood that although I have specified certain proportions and mode of treatment which I have found to be the best as the result of my experiments, yet I do not wish to limit myself to the exact proportions of the mixture herein stated to be the best, as other proportions may be found to be better for some other purposes than those already tried.

What I claim as my invention, and desire to secure by Letters Patent, is—

The production of a fertilizer for soils by the combination of dried blood with the compound which I have herein specified as my improved superphosphate of lime, or any equivalent therefor substantially the same as set forth.

JAS. J. MAPES.

Witnesses:
WILLM. B. NORTH,
SAML. GRUBB.